United States Patent
Chan et al.

(10) Patent No.: US 6,721,305 B1
(45) Date of Patent: *Apr. 13, 2004

(54) WIRELESS MESSAGE COURIER

(75) Inventors: Shun-Shing Chan, Fresh Meadows, NY (US); Michael Corey Greenwood, Holmes, NY (US); Te-Kai Liu, Elmsford, NY (US); Kiyoshi Maruyama, Chappaqua, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,354

(22) Filed: Oct. 9, 1998

(51) Int. Cl.[7] .............................. H04J 3/24; H04Q 7/20
(52) U.S. Cl. ...................... 370/349; 455/11.1; 455/421
(58) Field of Search ................................ 455/412, 404, 455/421, 456, 11.1, 9, 15, 445, 515, 517, 7, 440, 412.1, 13.1; 370/392, 328, 338, 349, 310, 389

(56) References Cited

U.S. PATENT DOCUMENTS

| | | | | |
|---|---|---|---|---|
| 5,223,844 A | * | 6/1993 | Mansell et al. | 340/825.49 |
| 5,794,143 A | * | 8/1998 | McCarthy et al. | 455/414 |
| 5,926,761 A | * | 7/1999 | Reed et al. | 455/440 |
| 5,950,113 A | * | 9/1999 | Meihofer | 455/517 |
| 5,963,866 A | * | 10/1999 | Palamara et al. | 342/450 |

* cited by examiner

Primary Examiner—Min Jung
Assistant Examiner—Andy Lee
(74) Attorney, Agent, or Firm—Douglas W. Cameron; Anne V. Dougherty

(57) ABSTRACT

A system and method for delivering electronic messages over a wireless cellular communications network when the sender of a message is out of the coverage area of any cell within the network. With this method the message is broadcast repeatedly until a mobile wireless courier receives the message when it is range and stores the message. When the courier is within range of a base station of the cellular communication network, it then transmits the stored message to the base station for transmission to a requested destination.

11 Claims, 5 Drawing Sheets

WIRELESS MESSAGE COURIER

FIELD OF THE INVENTION

This invention relates to two-way mobile wireless communication, and more specifically to a method for delivering an electronic message via a mobile wireless message courier.

BACKGROUND OF THE INVENTION

Current cellular phone users can use their cellular phones to reach the help center and make service requests, provided that they are in the footprint (coverage) of the base stations of their wireless service providers. If a cellular phone is integrated with location technology such as Global Position System (GPS), the location information of the user can be delivered to the help center automatically when the user calls the help center. But when users travel to the area where no wireless coverage exists (This may be due to the lack of wireless infrastructure or the terrain/building which blocks out the radio signals), they can no longer get help by making emergency service calls or 911 type calls. Therefore, there is a need for extending the communication capability provided by current wireless service providers in order to handle emergency situations.

BRIEF SUMMARY OF THE INVENTION

This invention is a method for delivering electronic messages wirelessly when the sender of a message is outside the coverage area of its wireless service provider. The method relies on a third-party mobile wireless message courier which wirelessly receives the sender's message when the courier enters the communication zone of the sender, stores the received message, and delivers the stored message when the courier enters the coverage area of its own wireless service provider.

The method exploits a broadcast wireless communication channel for peer-to-peer communication without the base station infrastructure of wireless service providers. Furthermore, the method requires a mobile unit which has two means of communications: one for communicating with its wireless service provider when it is in the coverage area and another for communicating with other parties through the peer-to-peer broadcast channel.

A requester who wants to reach the help center, and who is in the area not covered by its wireless service provider will repeatedly broadcast a help message which carries information such as the identity of the requester, the phone number of the party that the requester is trying to reach, the location of the requester, and the type of help the requester needs. If there is a mobile unit, such as a vehicle equipped with the aforementioned two means of communication, in the neighborhood of the requester, and the mobile unit is listening to the broadcast channel, the mobile unit can receive the broadcast message and store the message in its local storage. The mobile unit can connect to its wireless service provider when it enters the coverage area and deliver the stored help message on behalf of the requester. A mobile unit with the above characteristics is called a wireless message courier, or a courier for short, in the present invention.

A requester (the sender of a help message), in general, does not need to have both communication means that a wireless message courier has. A requester can have only one communication means, i.e., communicating over the broadcast channel, and always relies on wireless message couriers to deliver its messages. However, in the preferred embodiment of the present invention, all communication parties are assumed to have both communication means, which means that they all can potentially function as a wireless message courier. That is, a wireless message courier has two modes of operation. In a normal situation, it stays in the Relay mode and serves as a courier which listens to the broadcast channel for receiving possible broadcast messages. When a courier is in emergency situation, i.e., it needs other couriers to deliver a help message for itself, it stays in the Request mode and starts broadcasting help messages.

The nature, principle and utility of the invention will become more apparent from the following detailed description when read in conjunction with the accompanying drawings.

DETAILED DESCRIPTION OF THE PREFERRED EMBODIMENT

Figure 1:
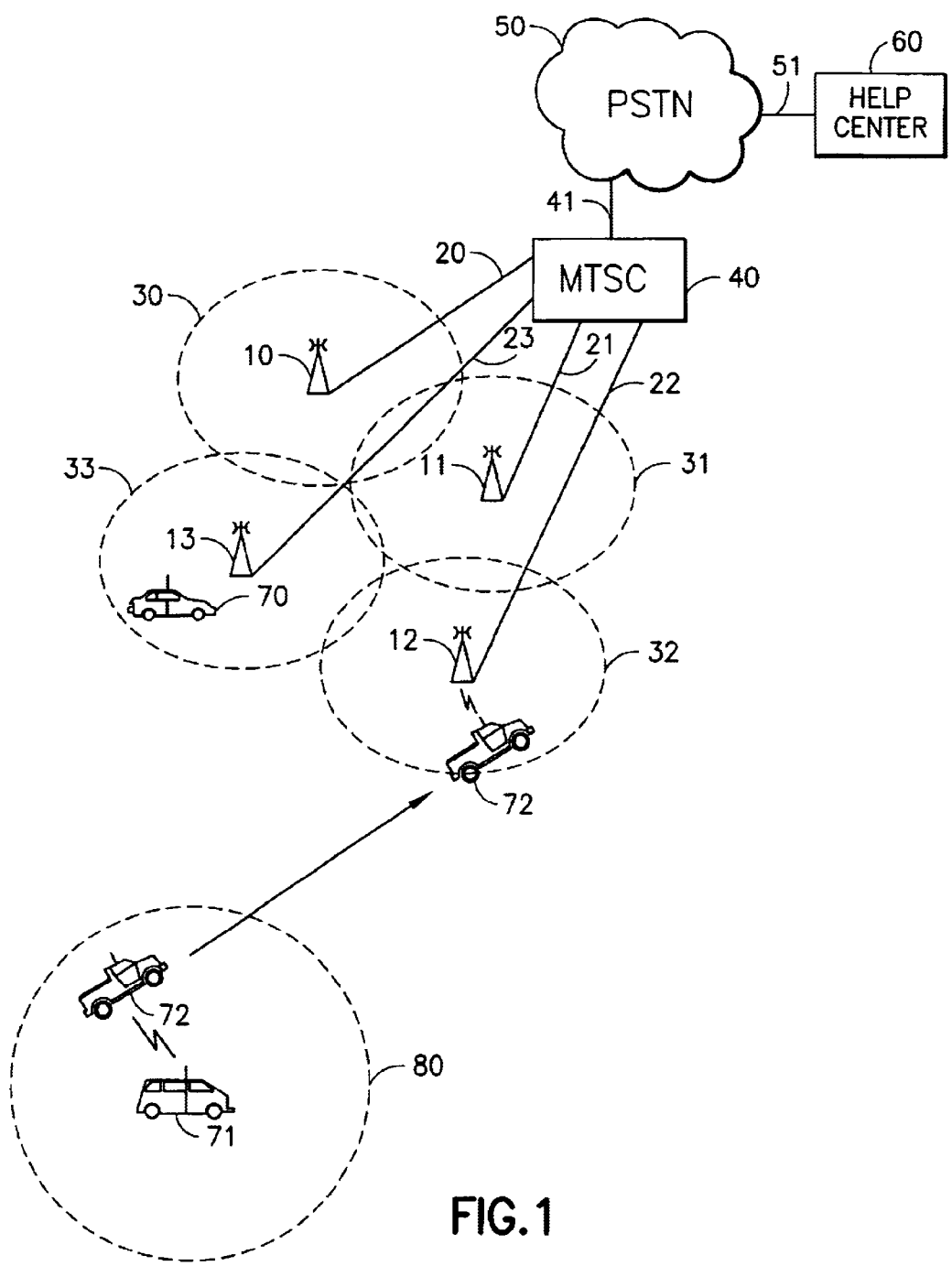
FIG. 1 is a schematic diagram showing how a wireless message courier helps in delivering a electronic message for a requester which is not in the coverage area of the wireless service provider according to the present invention.

FIG. 1 shows a communication system in which the method of delivering electronic messages using a wireless message courier can be implemented. Base stations 10, 11, 12, and 13 are responsible for communication in service areas (or cells) 30, 31, 32, and 33, respectively. The base station 13, for example, is responsible for wireless communication with mobile station 70. Base stations 10, 11, 12, and 13 are connected to a mobile telephone switching center (MTSC) 40 through lines 20, 21, 22, and 23, respectively. The MTSC 40 is connected to a public switched telephone network (PSTN) 50 through line 41. The PSTN 50 has a public phone line 51 connecting to a help center 60, which is responsible for receiving emergency calls.

FIG. 1 shows a mobile station 71, which is in need of emergency service but which is not in the coverage area of any base station. The mobile station 71 repeatedly broadcasts a message on a wireless channel which has a communication zone 80. Another mobile station 72, which passes through the communication zone 80 of mobile station 71, receives and stores the broadcast message. The mobile station 72 will store the message until it reaches an area covered by a base station, at which point the mobile station 72' calls the help center 60 through the base station 12, the MTSC 40, and the PSTN 50, and then delivers the stored message.

Figure 2:
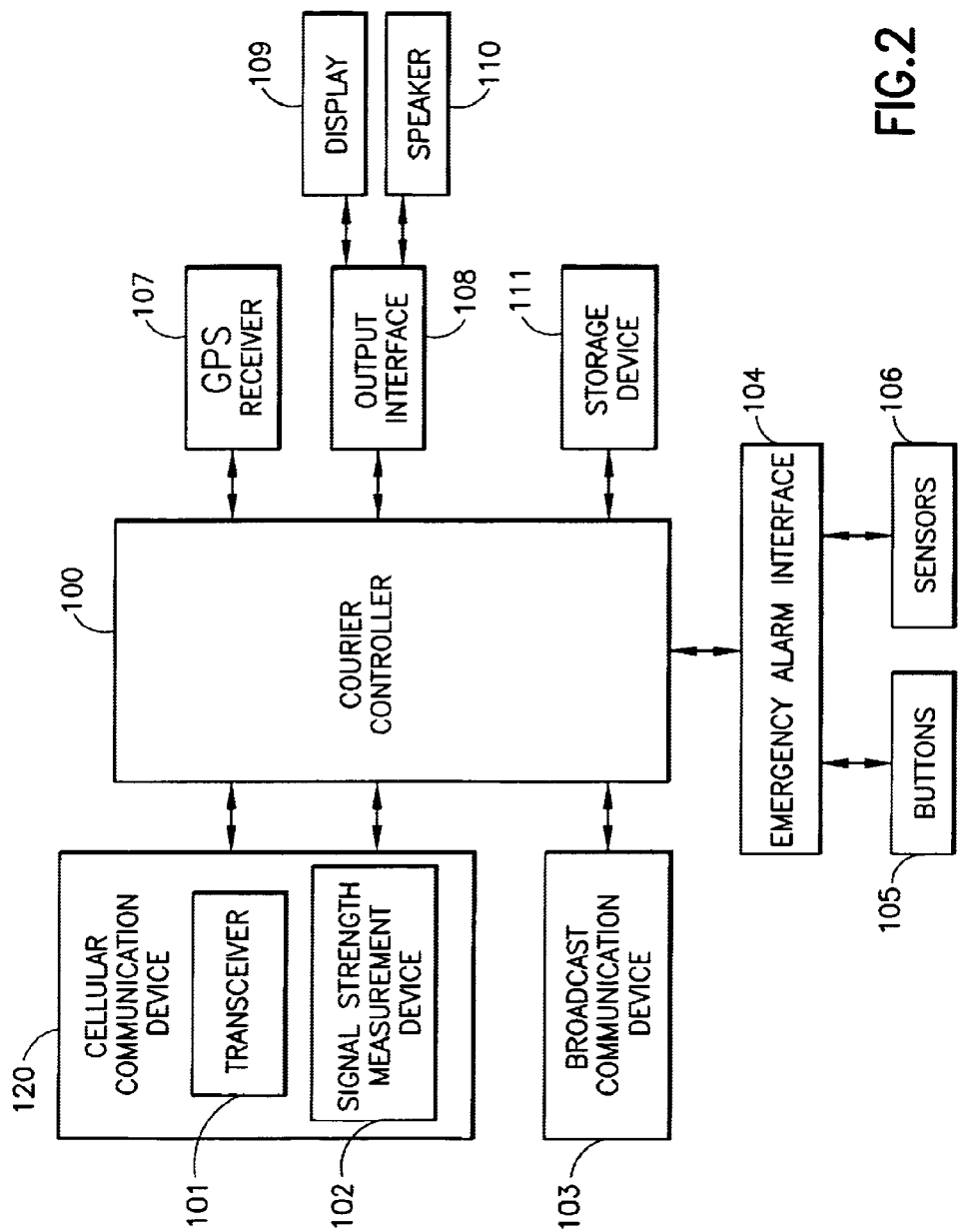
FIG. 2 is a block diagram showing the functional modules of the wireless message courier enabling the message delivery method according to the present invention.

In this embodiment, the functional block diagram of a mobile station is shown in FIG. 2. The courier controller 100 controls the communication aspect of a mobile station. The courier controller 100 has two means of wireless communication: one means for communicating with a cellular base station through a cellular communication device 120, and the other means for communication with other mobile stations through a broadcast communication device 103. The cellular communication device 120 is full-duplex, and the broadcast communication device 103 is half-duplex provided that the communicating parties are within the range of coverage. The courier controller 100 is connected to a signal strength measurement device 102, which can inform the courier controller whether it is in the coverage area of cellular base stations.

The courier controller 100 is connected to an emergency alarm interface 104 which is connected to push buttons 105 such as panic button, and/or to sensors that react to a vehicle emergency such as impact sensor and fire sensor. When the panic button is pushed or when the impact sensor is triggered, the emergency alarm interface 104 will interrupt the courier controller 100 and report the circumstance of an emergency.

The transceiver 101 is used to transmit/receive packets to/from the wireless communications channel/courier controller 100. The cellular communication device 120 is essentially a commercially available cellular modem which implements a standard wireless communication protocol. The signal strength measurement device 102 which is part of any standard cellular communications modem, measures the power level of a signal transmitted from a base station within communications range of the receiving modem. The results of the latter measurement is then presented to the courier controller. The broadcast communication device 103 is essentially a transmitter/receiver which is used to broadcast and receive packets transmitted over a shared wireless communication channel. The current family radio channel allocated by the FCC for voice communications would be ideal for ranges up to four miles for broadcasting these messages. The ALOHA random access protocol could be used to transmit packets over these channels; however, FCC approval would be necessary. The courier controller can be implemented using a standard PC which supports the Universal Serial Bus (USB) standard. The controller is also programmed to implement the flow charts shown in FIGS. 4–5 and includes device drivers to control the cellular modem 120, the broadcast communication device 103, the GPS (Global Positioning System) receiver 107, the output interface 108, the storage device 111, and emergency alarm interface 104.

A GPS (Global Positioning System) receiver 107 connected to the courier controller 100 will receive GPS satellite signals, process the signals, and inform the courier controller 100 as to the current position of the mobile station.

All the status information about the mobile station or the progress of emergency handling procedure is presented to the driver by visual display 109 or audio speaker 110, both being connected with the output interface 108, which in turn is connected to the courier controller 100.

The storage device 111, which is connected with the courier controller 100, is used for storing incoming or outgoing messages and other required information such as driver/vehicle identification information and phone directory.

The GPS receiver 107 is a standard off-the-shelf receiver which is used to present location information to the courier controller. The output interface 108 (optional) is merely an interface between the courier controller and the display device 109 or speaker 110 and is responsible for formatting data for the display device and speaker. The storage device would be implemented using, for example, a flash memory. The emergency alarm interface 104 is merely a logic gate for receiving signals from the buttons 105 or sensors (such as impact sensors) 106.

Figure 3:
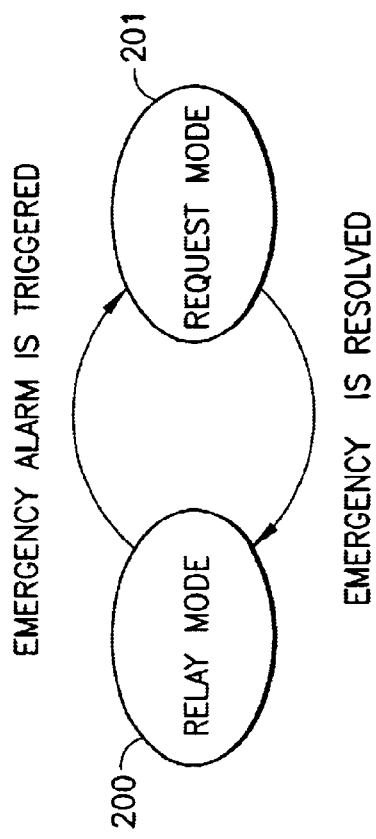
FIG. 3 is a diagram showing the two modes of operation of a wireless message courier, namely the Request and Relay modes.

FIG. 3 shows the two modes of operation of a mobile station. Normally, a mobile station stays in the Relay mode 200, wherein it functions as a wireless message courier and helps deliver emergency messages for other mobile stations. When a mobile station itself is in emergency, the mobile station goes to the Request mode 201, wherein it tries to reach the help center 60. The detailed procedures for the two modes of operation are described in FIG. 4 and FIG. 5.

Figure 4:
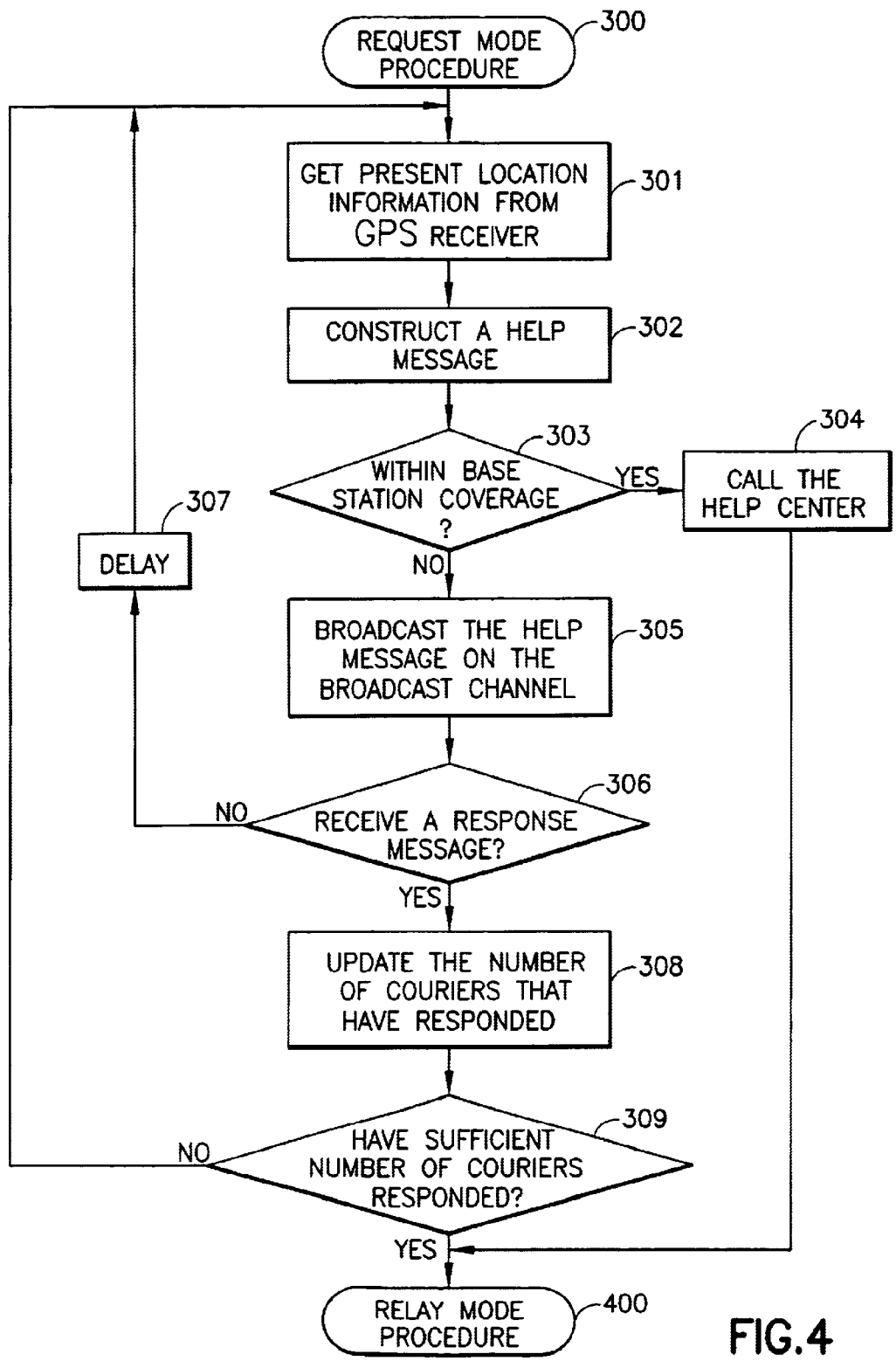
FIG. 4 is a flowchart showing the procedure to broadcast a message to other couriers when the courier is in the Request mode according to the present invention.

FIG. 4 is a flowchart describing the procedure 300 that a courier controller follows when the mobile station enters the Request mode 201 (FIG. 3), i.e., when an emergency alarm goes off. First in step 301 the courier controller 100 obtains the longitude/latitude/altitude coordinates of its current position from the GPS receiver 107 (FIG. 2). The controller then in step 302 constructs a message containing its unique identification number, the phone number of the help center it tries to reach (most likely a toll-free number), its current position, and the kind of help it needs. Next in step 303 the controller 100 checks with signal strength measurement means 102 (FIG. 2) to see whether the mobile station is in the coverage of base stations. If yes, the controller 100 calls the help center 60 (FIG. 1), delivers the message, and enters the Relay mode 400. If the signal strength is zero or too weak, the courier controller 100 will use the broadcast communication device 103 (FIG. 2) to send out the message in step 305. The controller then in step 306 checks with the broadcast communication device 103 to see if it received a response message from another mobile station, acknowledging the successful reception of the message sent out in step 305. If not, the controller 100 waits for a random delay in step 307 and repeats step 301. The random delay is for avoiding persistent collision in the broadcast channel caused by two or more mobile stations that want to access the shared broadcast radio channel at the same time. If there is a response message received, the courier controller 100 updates the number of mobile stations that have responded in step 308. If sufficient number of mobile stations have responded as determined by a pre-specified criterion in step 309, the courier controller 100 can stop broadcasting and enter the Relay mode in step 400.

Figure 5:
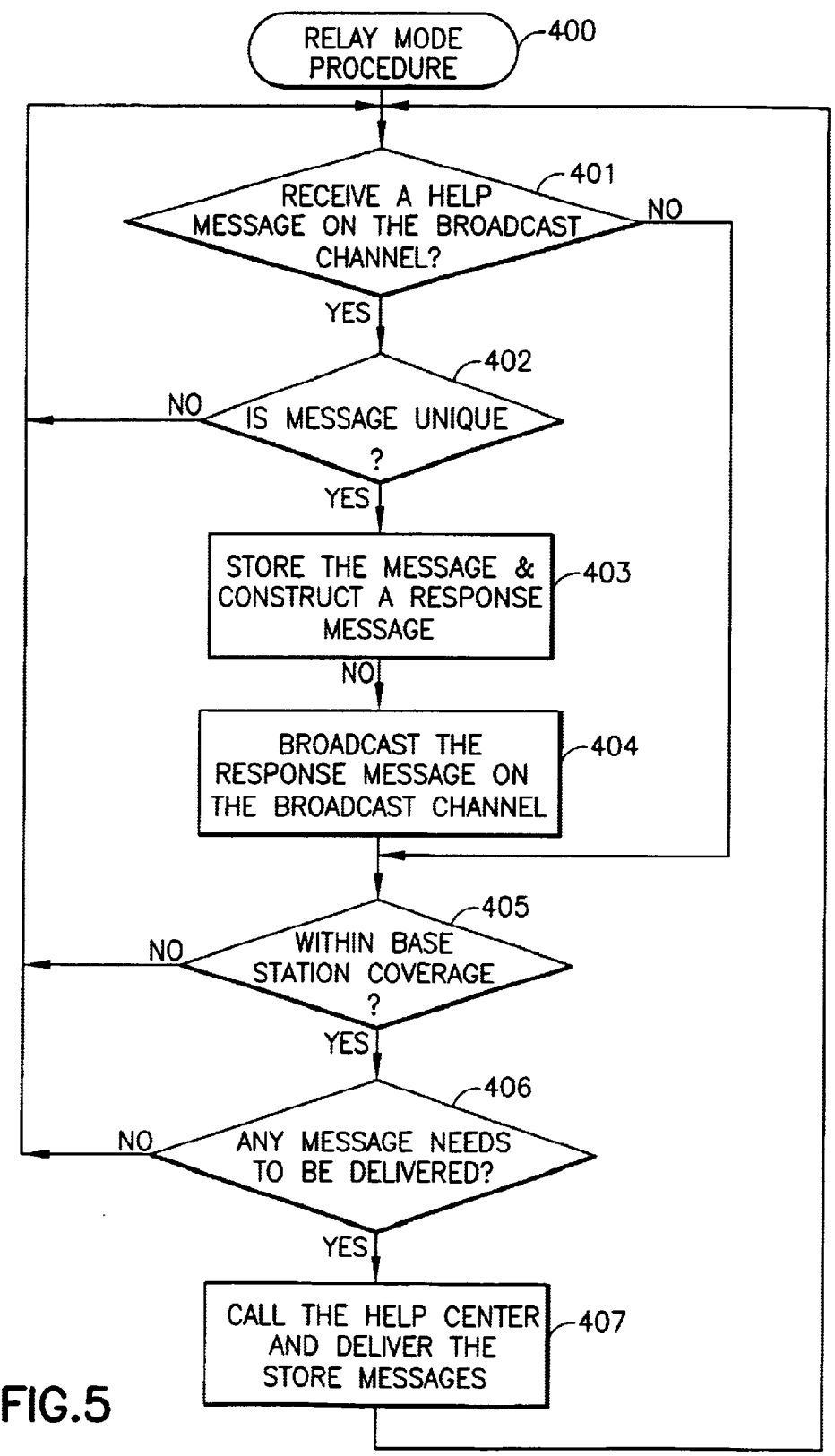
FIG. 5 is a flowchart showing the handling procedure when the courier is in the Relay mode according to the present invention.

FIG. 5 shows a flowchart describing the procedure 400 that a courier controller follows when the mobile station is in the Relay mode 200 (FIG. 3). First in step 401, the courier controller 100 checks with the broadcast communication device 103 (FIG. 2) to see if there is a received help message. If yes, the received help message is compared in step 402 against the already stored help messages in the storage device 111 (FIG. 2). If the message is a duplicate, it will be discarded immediately, and the courier controller 100 will go to step 401. Otherwise, the help message will be stored in the storage device 111 (FIG. 2), and a response message is constructed in step 403.

The response message is then broadcast in step 404 to acknowledge the sender of the help message. The courier controller 100 now tries to deliver the stored help message on behalf of the original sender. The courier controller 100 checks whether it is in the coverage area of a base station by way of the signal strength measurement device 102 (FIG. 2) in step 405. If not, the courier will go back to step 401 and check whether there are other help messages that have been received. If the courier is within the coverage area of base station, it will check in step 406 if there are outstanding help messages to be delivered. If there are no outstanding messages it goes back to step 401. If there are outstanding messages it will call the help center 60 (FIG. 1) and deliver all stored help messages in step 407. In step 401, if there are no help messages received, the courier controller 100 will go directly to step 405 and check for coverage status.

Many wireless protocols are available for communication between a mobile station and base stations, e.g., circuit-switched cellular data, Cellular Digital Packet Data (CDPD), mobile packet radio such as RAM or ARDIS, and specialized mobile radio (SMR) etc. A wireless message courier can use whatever is available to deliver emergency messages.

Figure 6:
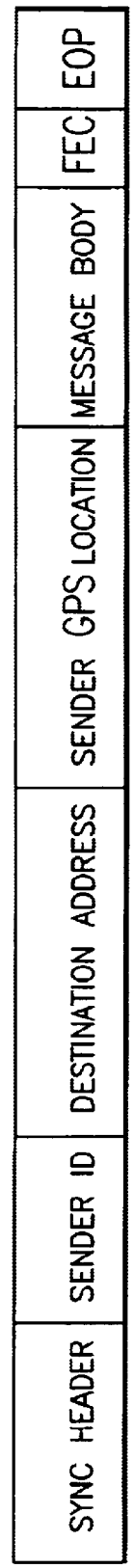
FIG. 6 is a schematic illustration of the packet format for the electronic message broadcast by the requesting wireless mobile unit.

Shown in FIG. 6 is the format of the electronic message that is used by the broadcast communication device 103. This format includes a standard synchronization header that is used in the Aloha protocol, the sender ID, the destination address, the sender's GPS location, and the message body. Finally, with the ALOHA protocol, the electronic message format also has the forward error correction (FEC) field, and the end of packet (EOP) information. The sender ID is used to identify the particular person sending the broadcast message and could be, for example, a social security number. The destination address is typically a telephone number or electronic address of an emergency service provider. The sender's GPS location is the standard global positioning system coordinates indicating the sender's location. The message body, which is optional, is used to indicate the particular type of service that the sender is requesting. The FEC and EOP fields are standard fields for wireless data communication to, respectively, reduce errors and indicate the end of the packet.

What is claimed is:

1. In a cellular communication system having at least one cell, with each cell comprising at least one base station for providing communication to wireless units in said each cell, a method for transmitting an electronic message from a requesting wireless mobile unit when said requesting wireless unit is out of communication range of any of said base stations, said method comprising:
   a. broadcasting said electronic message over at least a wireless communications channel from said requesting wireless mobile unit;
   b. receiving said electronic message at a receiving wireless mobile unit;
   c. storing said electronic message at said receiving wireless mobile unit until said electronic message can be transmitted to one of said base stations,
   d. periodically checking whether said receiving wireless mobile unit is within range of one of the base stations; and
   e. transmitting said stored electronic message from said receiving wireless unit to a requested destination via said cellular communication system by communicating said stored electronic message to one of said base stations only when said receiving wireless unit is within communications range of one of said base stations.

2. A method as recited in claim 1, wherein said electronic message comprises location information about a current location of said requesting wireless mobile unit.

3. A method as recited in claim 1, wherein said electronic message comprises a unique identification number of a user of said requesting wireless mobile unit, an address of said destination, and a message body.

4. A method as recited in claim 1, wherein said requesting wireless mobile unit receives location information about its current location.

5. A method as recited in claim 1, wherein an acknowledgment is transmitted from said receiving wireless mobile unit, indicating reception of said electronic message by said receiving wireless mobile unit.

6. A method as recited in claim 1, wherein said requesting wireless mobile unit repeatedly broadcasts said electronic message over said wireless communications channel, and wherein said requesting wireless mobile unit ceases broadcasting said electronic message when acknowledgments are received from a minimum number of receiving wireless mobile units, and wherein each acknowledgment indicates reception of said electronic message by one of said receiving wireless mobile units.

7. A method as recited in claim 1, wherein said electronic message is transmitted to said requested destination via a wired network from a base station of said cellular communication system.

8. In a cellular communication system being divided into a plurality of cells having a plurality of base stations, wherein each cell includes a base station for providing communication to communication units in said cells, a method for delivering an electronic message from a sender to a destined entity via a mobile unit, said electronic message comprising a unique identification number of said sender, an address of said destined entity, and a message body, said destined entity being in communication with said cellular communication system, said method comprising the steps of:
   a. repeatedly broadcasting said electronic message over a first wireless communication channel from said sender;
   b. receiving said broadcast message at a receiving wireless mobile unit, and storing said electronic message in said receiving wireless mobile unit's local storage device until said electronic message can be transmitted to one of said base stations;
   c. periodically checking whether said receiving wireless mobile unit is within range of one of the base stations; and
   d. transmitting said stored message to said destined entity via said cellular communication system when said receiving wireless mobile unit enters a cell of said cellular communication system only when said receiving wireless mobile unit is within range of the base station of said cell.

9. In a cellular communication system being divided into a plurality of cells having a plurality of base stations, wherein each cell includes a base station for providing communication to communication units in said cells, a method for delivering an electronic message from a sender to a destined entity via a mobile unit, said destined entity being in communication with said cellular communication system, said method comprising the steps of:
   a. receiving said sender's location information from a device which can locate the present position of said sender, and including said location information in said electronic message;
   b. repeatedly broadcasting, by said sender, said electronic message over a first wireless communication channel;
   c. receiving said broadcast message at a receiving wireless mobile unit, and storing said electronic message in it's local storage device until said electronic message can be transmitted to one of said base stations;
   d. periodically checking whether said receiving wireless mobile unit is within range of one of the base stations; and
   e. said receiving wireless mobile unit delivering said stored message to said destined entity via said cellular communication system when said receiving wireless mobile unit enters a cell of said cellular communication system only when said receiving wireless mobile unit is within range of the base station of said cell.

10. A program storage device readable by a machine, tangibly embodying a program of instructions executable by said machine to perform method steps to transmit an electronic message from a requesting wireless mobile unit when said requesting wireless mobile unit is out of communication range of any base station of a cellular communication system having at least one cell, with each cell comprising at least one base station for providing communications to wireless units in said each cell, said method comprising:

a. receiving an electronic message at a receiving wireless mobile unit, said electronic message having been broadcast by said requesting wireless mobile unit over at least a wireless communications channel;

b. storing said electronic message at said receiving wireless mobile unit until said electronic message can be transmitted to one of said base stations;

c. periodically checking whether said receiving wireless mobile unit is within range of one of the base stations; and d. transmitting said stored electronic message from said receiving wireless mobile unit to a requested destination via said cellular communication system by communicating said stored electronic message to one of said base stations only when said receiving wireless mobile unit is within communications range of one of said base stations.

11. A cellular communication system comprising:

a. a plurality of cells, each cell comprising at least one base station for providing wireless communication to wireless units in said each cell;

b. a first wireless transmitter for broadcasting an electronic message from a requesting wireless mobile unit when said requesting wireless mobile unit is out of communication range of any of said base stations, wherein said wireless transmitter is contained in said requesting wireless mobile unit;

c. a storage device for storing said broadcasted electronic message when received by a receiving wireless mobile unit until said electronic message can be transmitted to one of said base stations, wherein said storage device is contained in said receiving wireless mobile unit;

d. means for periodically checking whether said receiving wireless mobile unit is within range of one of the base stations; and e. a second wireless transmitter for transmitting said stored electronic message from said receiving wireless mobile unit to a requested destination via said cellular communication system by communicating said stored electronic message to one of said base stations only when said receiving wireless mobile unit is within communications range of one of said base stations.

* * * * *